United States Patent
Yang et al.

(10) Patent No.: US 6,247,705 B1
(45) Date of Patent: Jun. 19, 2001

(54) MANUAL TIGHTENED CHUCK

(75) Inventors: Guimo Yang; Shengzhi Yang; Mingquan Cai; Lianhai Long; Kangiun Sun, all of Wendeng (CN)

(73) Assignee: Shandong Weida Machine Tool Tools Group Corporation, Shandong (CN)

(*) Notice: Subject to any disclaimer, the term of this patent is extended or adjusted under 35 U.S.C. 154(b) by 0 days.

(21) Appl. No.: 09/381,139
(22) PCT Filed: Oct. 6, 1997
(86) PCT No.: PCT/CN97/00098
 § 371 Date: Dec. 17, 1999
 § 102(e) Date: Dec. 17, 1999
(87) PCT Pub. No.: WO98/40182
 PCT Pub. Date: Sep. 17, 1998

(30) Foreign Application Priority Data

Mar. 12, 1997 (CN) .......................................... CN97232403
Jul. 24, 1997 (CN) .......................................... CN97233807

(51) Int. Cl.7 ..................................................... B23B 31/12
(52) U.S. Cl. ............................................. 279/62; 279/902
(58) Field of Search ................................ 279/60–65, 902, 279/158; 40/913

(56) References Cited

U.S. PATENT DOCUMENTS

| | | | |
|---|---|---|---|
| D. 359,432 | * 6/1995 | Owens | D8/70 |
| 1,984,839 | * 12/1934 | Murray | 40/913 |
| 2,996,302 | * 8/1961 | Haviland et al. | 279/97 |
| 4,882,867 | * 11/1989 | Linden | 40/913 |
| 5,145,192 | * 9/1992 | Rohm | 279/62 |
| 5,193,824 | * 3/1993 | Salpaka | 279/60 |
| 5,342,154 | * 8/1994 | Holzer | 408/240 |
| 5,348,317 | * 9/1994 | Steadings et al. | 279/62 |
| 5,348,318 | * 9/1994 | Steadings et al. | 279/62 |
| 5,669,616 | * 9/1997 | Ho | 279/62 |
| 5,692,998 | * 12/1997 | Weigel | 40/913 |
| 5,944,328 | * 8/1999 | Lin et al. | 279/62 |

FOREIGN PATENT DOCUMENTS

97/06912 * 2/1997 (WO).

* cited by examiner

*Primary Examiner*—Steven C. Bishop
(74) *Attorney, Agent, or Firm*—Jenkens & Gilchrist, P.C.

(57) ABSTRACT

A manually tightened chuck has a separated nut in (7) fixed in a recess at a front sleeve (10) with close fit, and jaws (9) engaged by respective thread part of each radial out surface with the nut, which enables to reciprocate synchronously within corresponding bores at a chuck body (1) by rotating the front sleeve, a rear sleeve (2) fixed with keys (11) around the periphery of rear part of the chuck body free from turning each other, a thrust ball bearing (6) and a spring (4) arranged between the front and rear sleeves act for separating the relative movement of the sleeves and applying a final gripping force after the jaws touch a drill bit.

3 Claims, 4 Drawing Sheets

MANUAL TIGHTENED CHUCK

The present invention relates to a drill chucking device, and particularly, to a manually tightened drill chuck.

Various drill chucks now on the market generally comprise such parts as a body member, jaws, a front sleeve, a nut, a bearing, a bearing gasket, a front sleeve, a rear sleeve, a retainer for the front sleeve or a retaining spring. The body member is connected, with interference, to the bearing gasket, the rear sleeve, and the front sleeve retainer: three jaws are respectively received in three angled bores of the body member; and the nut is disposed in a nut groove of the body member to form a screw transmission with the threads on the jaws. A nut jacket is connected, with interference, to the exterior of the nut to make the split nut become an integral whole and the front sleeve mounted on the nut.

This type of nut is of complicated configuration and the groove on the nut needs to be worked by milling, which will cause an extremely large expense. For example, nut 60 in WO-A-97/06912 is with groove 66. If a nut is with a groove, a powder metallurgy material, which is easy to be moulded by die casting, bas to be used as the material for the nut. However, this kind of material can not achieve the level that high quality carbon tool steel can, affecting adversely the service life and reliability of the nut. If high—quality carbon tool steel is used, a step of groove milling will be added with high cost.

Therefore, an object of the present invention is to provide a manually tightened drill chuck wherein the nut can be effectively driven by rotating the front sleeve, and this type of drill chuck does not have a nut which requires the step of groove—milling with high cost, but employs a grooved nut jacket which is easily worked.

Another object of the present invention is to provide a manually tightened drill chuck in which the rear sleeve and the rear end of body member are fitted securely with a reliable performance.

To achieve the above objects of the present invention, said nut jacket has a bottom portion towards the front end of the body member, and several key slots are cut out axially in the bottom portion. The keys correspondingly provided on the front sleeve can be inserted into said key slots in the bottom portion of the nut jacket in order that the nut jacket and further the nut can be driven to rotate when the front sleeve rotates, causing the jaws to advance or retract in the angled bores of the body member, thus realizing the opening or closing of the jaws; at the outer wall of the rear end of said body member, there is milled a cylindrical guide part, which is immediately followed by several symmetrically distributed recesses with parallel axes, and the inner wall of the rear sleeve is also provided with a cylindrical guide portion, several symmetrically distributed keys, which project in the direction of the axis of the portion, are inserted into said recesses, thus causing the rear sleeve and the body member to be fixed and unrotatable relative to each other, and avoiding a slippage produced due to a looseness between the body member and the rear sleeve .

Present invention has the advantages of a rational configuration, convenient assembly, stable performance and reliable operation, and is applicable to various chucking devices of manually tightened drills.

The present invention will be further described below in conjunction with the accompanying drawings wherein.

Figure 1:
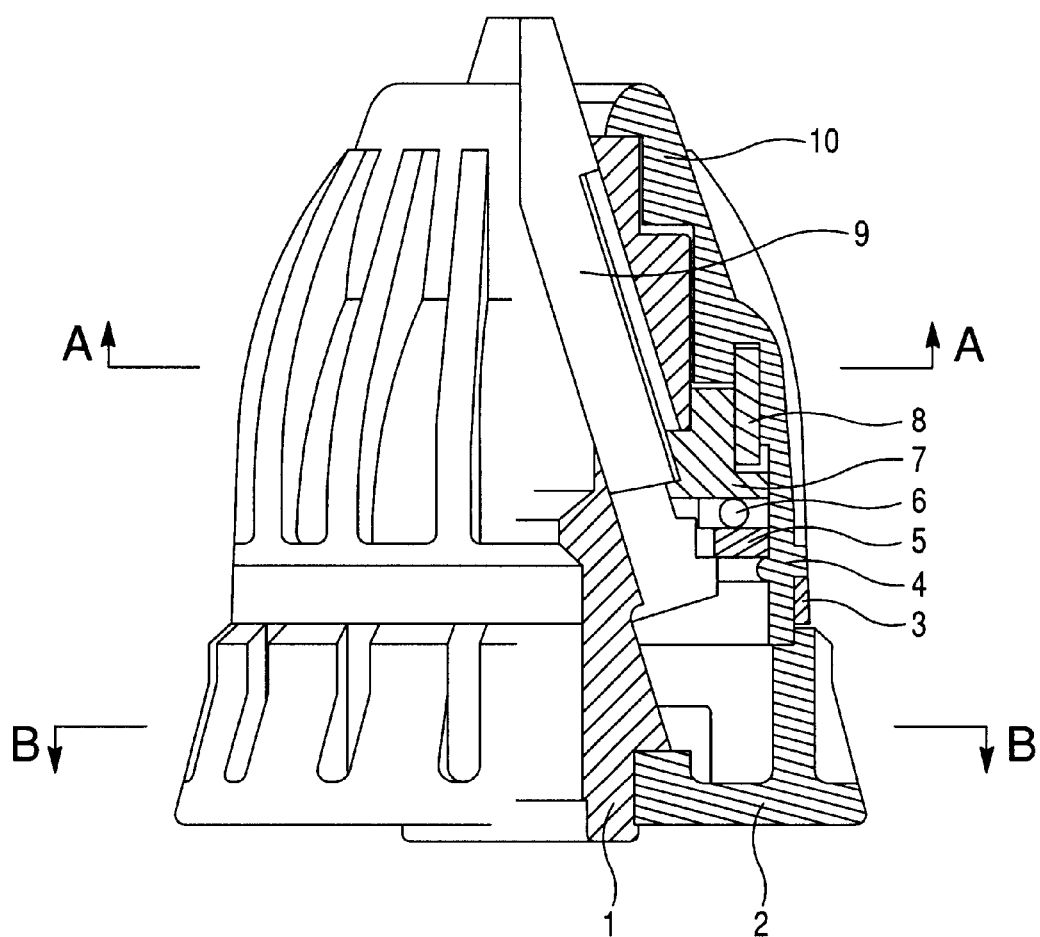
FIG. 1 is a configurational schematic view of the present invention.
Figure 2:
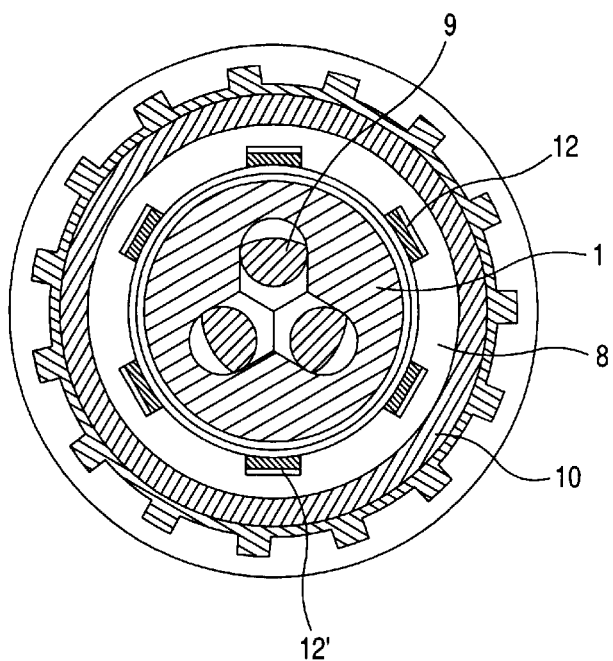
FIG. 2 is a schematic view in the direction of A—A in FIG. 1.

Referring to FIG. 1., it shows a manually tightened drill chuck comprising a body member 1, a rear sleeve 2, a decorating ring 3, a retaining spring 4, a bearing gasket 5, a bearing 6, a nut 7, a nut jacket 8, plurality of jaws 9, a front sleeve 10 and other components. In the present invention, three jaws 9 are received in the three angled bores in body member 1, threads are provided on the outer sides of jaws 9, and nut 7 is mounted in a nut groove of body member 1; because of the requirements of the assembly process, nut 7 is split into two halves; at the inner wall of the lower end of front sleeve 10 is circumferentially provided with a semi-circular groove in which is received a resilient opened retaining spring 4, the latter being blocked under bearing gasket 5; there is a certain spacing between retaining spring 4 and bearing gasket 5, which neither affects the rotation of front sleeve 10, nor causes front sleeve 10 to play beyond the spacing; a nylon decorating ring 3 is sleeved on the outer wall of the lower end of front sleeve 10; and the outer side of nut 7 is attached to a nut jacket 8 with interference to fasten the split nut into an integral whole. Referring to FIG. 2, it shows more clearly the attachment of the nut jacket and the front sleeve, nut jacket 8 comprising a bottom portion on which several key slots 12' are provided axially while in front sleeve 10 are correspondingly provided axially with several keys 12. When nut jacket 8 is fitted with front sleeve 10, keys 12 on front sleeve 10 can be correspondingly inserted into key slots 12' of nut jacket 8, by rotating front sleeve 10, to drive nut jacket 8 and further nut 7 to rotate as front sleeve 10 rotates and, further through the threaded fitting of nut 7 and jaws 9, to cause jaws 9 to advance or retract in the angled bores of body member 1, thus causing three jaws 9 to open or close so as to achieve the purpose of chucking or releasing the drill.

Figure 3:
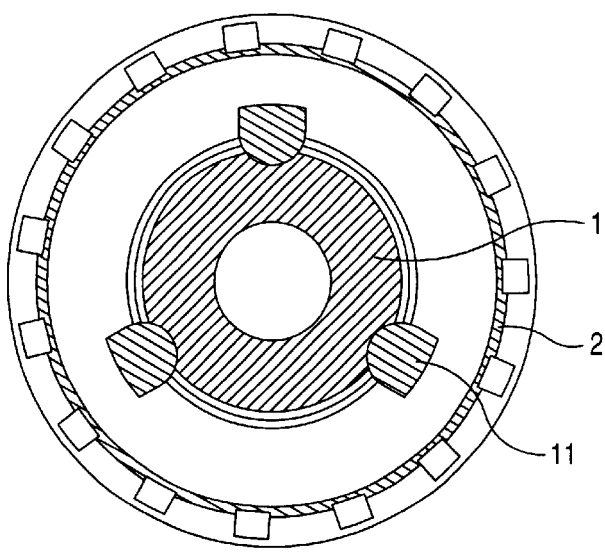
FIG. 3 is a schematic view in the direction of B—B in FIG. 1.
Figure 4:
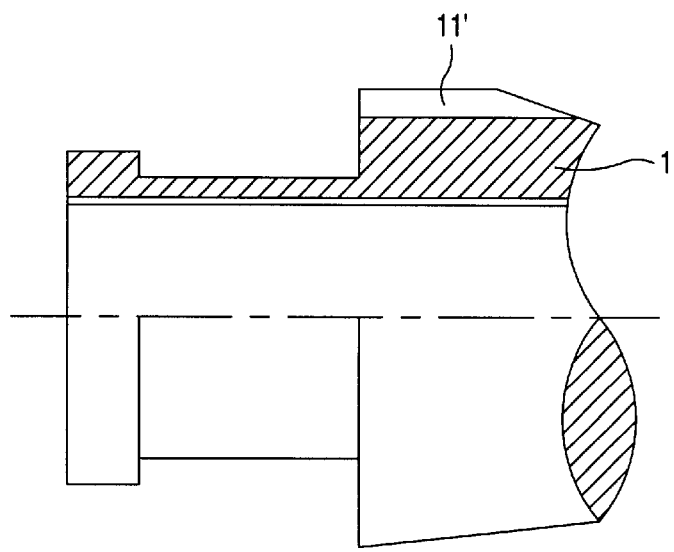
FIG. 4 is a partial schematic view of a rear end of a body member in FIG. 1.
Figure 5:
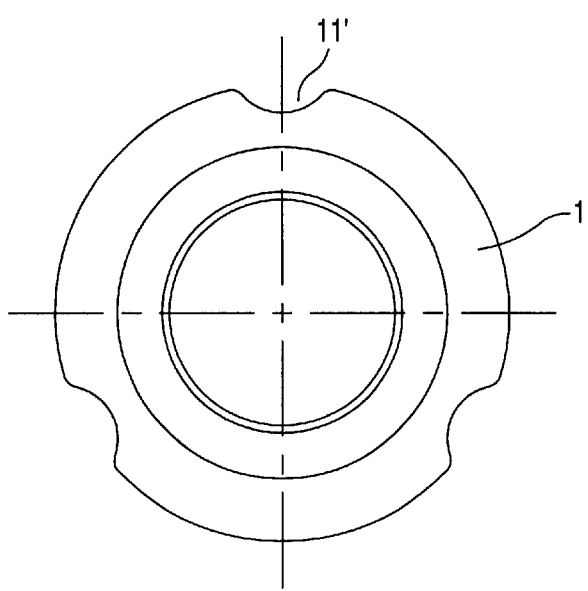
FIG. 5 is a left side view of FIG. 4.
Figure 6:
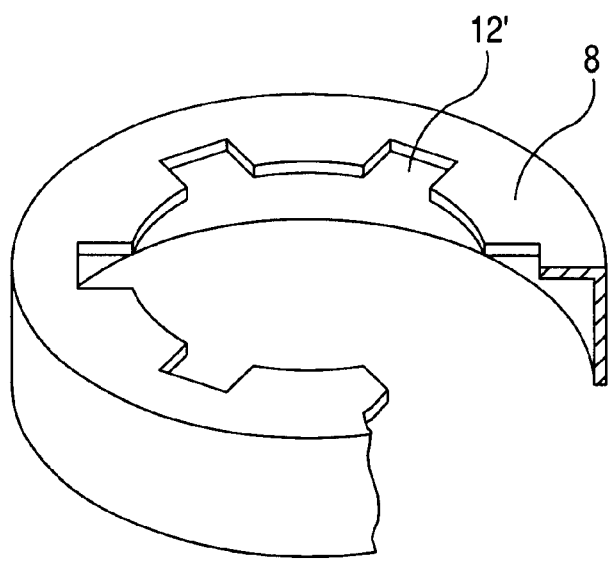
FIG. 6 is partially cut away perspective view of a nut jacket.

FIG. 3 shows the fitting of the rear end of the body member and the rear sleeve, and FIG. 4 and FIG. 5 show the configuration of the rear end of the body member. At the outer wall of the rear end of body member 1 is provided a length of cylindrical guide portion, and on rear sleeve 2 there is a corresponding cylindrical guide portion to control the jitter level of rear sleeve, and the axial play; Behind the cylindrical guide portion of the rear end of body member 1 are cut out several symmetrically distributed deep recesses 11' parallel to the axis, in the axial direction along the cylindrical guide portion, several symmetrically distributed keys project from the rear sleeve, and when the rear sleeve is connected with the rear end of the body member, keys 11 of the rear sleeve are inserted into recesses 11' of the outer wall of the rear end of body member 1, thus making the body member and the rear sleeve fixed to each other to prevent a relative rotation between them.

What is claimed is:

1. A manually tightened drill chuck comprising:
    a bearing (1), jaws (9), a split nut (7), a bearing (6), a bearing gasket (5), a front sleeve (10), a rear sleeve (2), a nut jacket (8), a retainer for the front sleeve (10) or a retaining spring, uniformly distributed angled bores and a nut groove being provided on the body member (1);
    the body member (1) being fitted with interference to the bearing gasket (5), the jaws (9) being respectively received in the uniformly distributed angled bores around the body member (1), the split nut (7) being mounted in the nut groove of the body member (1) to form a threaded transmission by fitting with threads of the jaws (9), the nut jacket (8) being fitted with interference to the outer side of the split nut (7) to make the split nut (7) into an integral whole, and the nut jacket (8) being fitted within the front sleeve (10); and wherein the nut jacket (8) has a periphery connected with interference to the split nut (7) and has a bottom portion further comprising several axially spaced keyslots (12') are cut out for transmitting torques, and keys (12) correspondingly provided on the front sleeve (10) are inserted into said key slots (12') of the bottom portion of the nut jacket (8) such that when the front sleeve (10) is rotated, the nut jacket (8) is driven to rotate, and further the split nut (7) is driven to rotate, thus causing the jaws (9) to advance or retract in the angled bores of the body member (1) and achieving the opening or closing of the jaws (9).

2. A manually tightened drill chuck as described in claim 1, wherein a rear portion of said body member is provided with a cylindrical guide portion and is cut out to form several symmetrically distributed recesses (11') with parallel axes, and the inner wall of said rear sleeve (2) is provided with a correspondingly cylindrical guide portion, such that when the rear end of the body member is fitted with said rear sleeve, several corresponding symmetrically distributed keys (11), with parallel axes, projecting axially from the cylindrical portion of the rear sleeve are inserted into the recesses (11') of the rear portion of said body member, causing the body member and the rear sleeve to be fixed relative to each other.

3. A manually tightened drill chuck as described in claim 1, wherein the outer wall of the lower end of the front sleeve (10) is enclosed within a nylon decorating ring (3).

* * * * *